(12) United States Patent
Fox et al.

(10) Patent No.: US 8,926,190 B2
(45) Date of Patent: Jan. 6, 2015

(54) SEGMENTED BEARING RETAINER

(75) Inventors: Gerald P. Fox, Massillon, OH (US); Brian Werner, Carrollton, OH (US); Thomas J. Rybkoski, Canton, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 13/976,650

(22) PCT Filed: Dec. 22, 2011

(86) PCT No.: PCT/US2011/066749
§ 371 (c)(1), (2), (4) Date: Jul. 26, 2013

(87) PCT Pub. No.: WO2012/092107
PCT Pub. Date: Jul. 5, 2012

(65) Prior Publication Data
US 2013/0294718 A1 Nov. 7, 2013

Related U.S. Application Data

(60) Provisional application No. 61/427,289, filed on Dec. 27, 2010.

(51) Int. Cl.
*F16C 33/54* (2006.01)
*F16C 43/04* (2006.01)
*F16C 33/46* (2006.01)
*F16C 33/52* (2006.01)

(52) U.S. Cl.
CPC .............. *F16C 43/04* (2013.01); *F16C 33/4611* (2013.01); *F16C 33/4664* (2013.01); *F16C 33/526* (2013.01); *F16C 33/54* (2013.01)
USPC ....... 384/573; 384/578; 384/623; 29/898.067

(58) Field of Classification Search
CPC .... F16C 33/467; F16C 33/502; F16C 33/541; F16C 33/548; F16C 33/4664; F16C 33/4682
USPC ................. 384/573, 578, 583, 623, 907, 910; 29/898.067
See application file for complete search history.

(56) References Cited

U.S. PATENT DOCUMENTS

| 847,261 A | 3/1907 | Rennerfelt |
| 930,599 A | 8/1909 | Hess |

(Continued)

FOREIGN PATENT DOCUMENTS

| DE | 2602265 A1 * | 7/1976 | .............. F16C 29/04 |
| DE | 3635261 A1 * | 7/1987 | .............. F16C 33/38 |

(Continued)

OTHER PUBLICATIONS

International Search Report for PCT application PCT/US2011/066749 mailed Aug. 21, 2012.

(Continued)

*Primary Examiner* — Marcus Charles
(74) *Attorney, Agent, or Firm* — Michael Best & Friedrich LLP

(57) ABSTRACT

A bearing cage assembly comprising of a plurality of discrete bridge elements coupled between first and second cage support wire rings having selected tensions, and conforming to the surfaces of associated rolling elements. The discrete bridge elements maintain rolling element in separation, provide rolling element retention within the bearing assembly, and function as a lubrication reservoir for grease lubricated bearings. The discrete bridge elements may be disposed between adjacent rolling elements, or may be configured to pass through axial bores of hollow rolling elements.

22 Claims, 8 Drawing Sheets

(56) References Cited

U.S. PATENT DOCUMENTS

| | | | |
|---|---|---|---|
| 1,039,017 A * | 9/1912 | Bonneess | 411/233 |
| 1,996,841 A | 4/1935 | Stevens | |
| 2,969,267 A * | 1/1961 | Gothberg | 384/580 |
| 3,081,116 A * | 3/1963 | Weiner et al. | 403/44 |
| 3,284,146 A | 11/1966 | Ripple | |
| 3,582,164 A | 6/1971 | Derner et al. | |
| 3,989,394 A * | 11/1976 | Ellis | 403/46 |
| 4,436,349 A * | 3/1984 | Hallerback | 384/572 |
| 4,976,719 A * | 12/1990 | Siepser | 606/151 |
| 5,388,918 A | 2/1995 | Williams | |
| 5,469,620 A | 11/1995 | Zinken | |
| 5,660,485 A | 8/1997 | Podhajecki et al. | |
| 5,897,215 A | 4/1999 | Mirring | |
| 6,068,408 A | 5/2000 | Mutoh et al. | |
| 6,287,012 B2 | 9/2001 | Matsuoka | |
| 6,461,049 B2 | 10/2002 | Straub et al. | |
| 6,471,408 B1 | 10/2002 | Ikeda et al. | |
| 6,619,845 B2 | 9/2003 | Murata | |
| 6,666,585 B1 * | 12/2003 | Kotzalas et al. | 384/578 |
| 6,779,923 B2 | 8/2004 | Murata | |
| 7,073,948 B2 | 7/2006 | Neder et al. | |
| 7,507,028 B2 | 3/2009 | Markle | |
| 7,571,706 B2 | 8/2009 | Ichikawa et al. | |
| 7,753,593 B2 | 7/2010 | Tsujimoto | |
| 7,771,122 B2 | 8/2010 | Nagai | |
| 8,057,105 B2 | 11/2011 | Earthrowl et al. | |
| 8,167,501 B2 | 5/2012 | Perkinson et al. | |
| 8,282,286 B2 | 10/2012 | Kanai | |
| 8,308,372 B2 | 11/2012 | Omoto | |
| 2006/0115193 A1 * | 6/2006 | Begin | 384/523 |
| 2008/0019622 A1 * | 1/2008 | Chen | 384/51 |
| 2009/0046974 A1 | 2/2009 | Omoto et al. | |
| 2009/0324410 A1 | 12/2009 | Omoto et al. | |
| 2010/0129022 A1 | 5/2010 | Beyfuss et al. | |
| 2010/0166355 A1 | 7/2010 | Schlegal et al. | |
| 2010/0329599 A1 | 12/2010 | Beyfuss et al. | |
| 2012/0014633 A1 | 1/2012 | Beyfuss et al. | |
| 2012/0163748 A1 | 6/2012 | Henneberger et al. | |
| 2012/0195541 A1 | 8/2012 | Friedrich et al. | |
| 2012/0207422 A1 | 8/2012 | Fukami et al. | |
| 2012/0263408 A1 | 10/2012 | Yamada et al. | |
| 2013/0188900 A1 * | 7/2013 | Beck et al. | 384/573 |

FOREIGN PATENT DOCUMENTS

| | | |
|---|---|---|
| DE | 8621532 U1 | 12/1987 |
| DE | 4027109 A1 | 3/1992 |
| DE | 102007031792 A1 | 1/2009 |
| DE | 102008053313 A1 | 5/2010 |
| DE | 102009006858 A1 | 8/2010 |
| EP | 193058 A2 | 9/1986 |
| FR | 362512 | 6/1906 |
| JP | 9242759 | 9/1997 |
| WO | 2008040290 A1 | 4/2008 |
| WO | 2011031931 A1 | 3/2011 |
| WO | 2011080961 A1 | 7/2011 |
| WO | 2012076594 A1 | 6/2012 |

OTHER PUBLICATIONS

Written Opinion of the International Search Authority for PCT application PCT/US2011/066749 mailed Aug. 21, 2012.

* cited by examiner

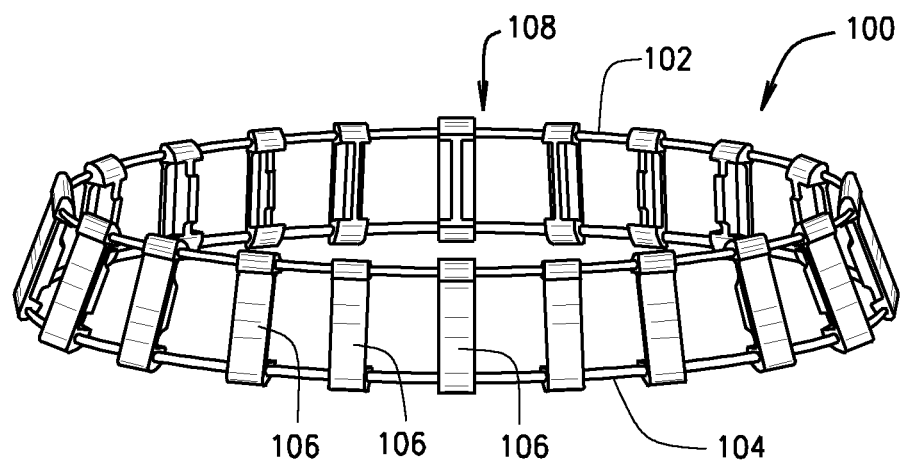
F I G . 1
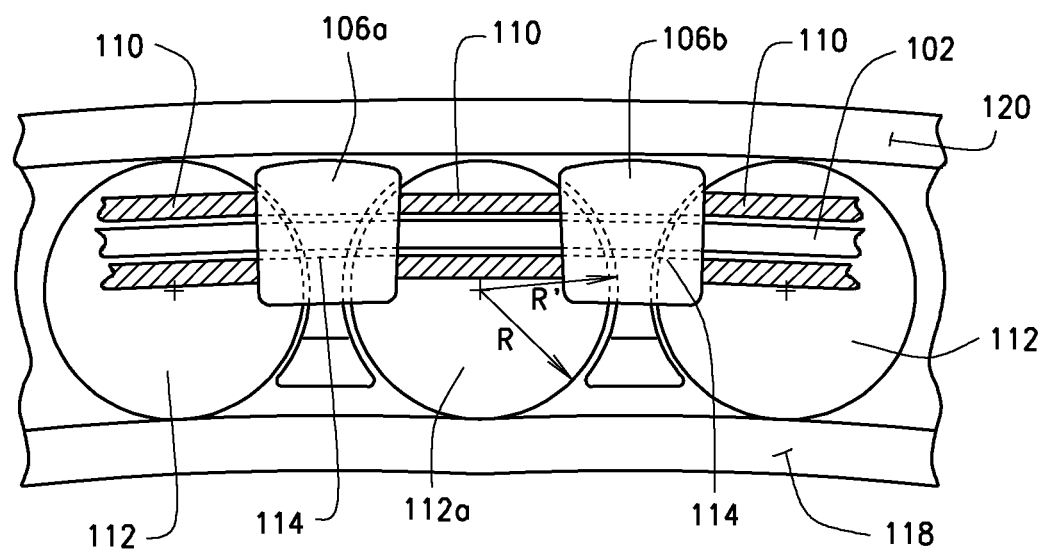
F I G . 2

SEGMENTED BEARING RETAINER

CROSS-REFERENCE TO RELATED APPLICATIONS

The present application is related to, and claims priority from, U.S. Provisional Application Ser. No. 61/427,289 filed on Dec. 27, 2010, and International Application PCT/US2011/066749 filed Dec. 22, 2011 and published under International Publication No. WO 2012/092107, by Fox et al. for "Segmented Bearing Retainer for Wire Support Rings", both of which are herein incorporated by reference.

BACKGROUND OF THE INVENTION

The present application is related generally to large-bearing cage configurations, and in particular, to a large-bearing cage assembly, comprising of a plurality of discrete bridge elements coupled between axially-spaced cage wire rings which are adjacent opposite axial ends of the rolling elements.

The typical approach to large-bearing cage design has been to extend the design styles for smaller conventional bearings into the large bearing sizes. The first and most common attempt at meeting the needs of larger bearings used pin style cages to facilitate placement and retention of the rolling elements. While pin style cages provide excellent retention, they are heavy, complex, costly to assemble, block the flow of lubricant to critical wear surfaces, and cannot be disassembled without damaging either the cage rings or the cage pins.

Another approach is to modify a stamped-steel style cage for use in the large bearing size range. The first problem here is that for large bearing configurations, the cage designs become too large to be stamped or closed in, so alternate manufacturing processes, such as spun blanks that are water jet cut have been attempted. These alternative manufacturing processes seem to create more problems than they solve. The stamping problems for large size cages are eliminated, but at great cost. Cage costs are effectively increased, not lowered, by the use of alternative manufacturing processes. The step of closing-in is replaced by the steps of cutting the cage, adjusting the circumferential size to get appropriate clearance and welding the cage back together, a complex and costly process. Cage distortion, particularly in pocket length and location, as well as cage roundness and flatness, resulting from this manufacturing process can lead to bearing performance and roller retention issues if not controlled sufficiently. These types of cages are still relatively heavy, and are not easily serviceable. Typically, the resulting cage must be cut and re-welded when serviced.

Both the pin-style and formed cages require welding in close proximity to precision bearing components. There is therefore always a risk of bearing damage due to heat and welding spatter and debris.

Another alternate which has been tried is the use of segmented polymer cage structures as a more cost effective solution than the spun-blank water-jet cut steel cage, however, while polymer segmented cages have demonstrated the ability to perform satisfactorily in testing, they have potential limitations in scaling up to extremely large bearings. The polymer cages currently used in ultra large bearings market have all been made from polyether ether ketone (PEEK), a colorless organic polymer thermoplastic. For extremely large bearings the size and strength of the cage will need to be increased. The greater volume of PEEK required to make a sufficiently strong cage may become cost prohibitive.

An additional concern with any bearing assembly is a proper flow of lubrication to the critical wear surfaces on the bearing elements. A visual marking of rollers has been observed with water-jet cut steel cages and to a lesser extent with the polymer thermoplastic cages. Pin style cages have been known to have issues with pin wear or breakage due to lack of lubricant between the pin and roller. The large, rectangular section cage rings at each end of the rollers of the pin type may act to impede the circulation of grease in these lubrication systems. Likewise the flanges at each end of polymer segments in a polymer segmented cage, while acting to maintain grease within the roller complement, may affect the circulation of grease into and out of the complement. Alternate polymer segment flange designs can address this issue, but a significant flange is a basic requirement of the design of a polymer segmented cage Accordingly, it would be advantageous to provide a segmented bearing cage or retainer assembly which offers the ability to retain very heavy sets of rollers in large bearing assemblies, which does not impede the flow of lubricant to the wear critical surfaces of the bearing assembly, and which is relatively low cost to manufacture.

BRIEF SUMMARY OF THE INVENTION

Briefly stated, the present disclosure provides a bearing assembly having a plurality of rolling elements disposed about a circumference of a race member with a segmented bearing retainer assembly. The segmented bearing retainer assembly consists of a plurality of discrete bridge elements coupled between first and second wire support rings. Each discrete bridge element is configured to maintain a spacing between adjacent rolling elements in the bearing assembly, and to retain the rolling elements relative to said race member.

In one embodiment, the discrete bridge elements of the segmented bearing retainer assembly are disposed between adjacent rolling elements in the bearing assembly. Each discrete bridge element consists of a curved retention web supported by a segment bridge between the adjacent rolling elements, and an attachment eyelet at opposite ends through which the first and second wire support rings pass. Each retention web has a curvature selected to distributed a contact load between an adjacent roller and the bridge element both above and below a centerline of the roller. The discrete bridge elements are maintained in a desired spaced arrangement about the circumference of the bearing assembly, between the first and second wire support rings, by a plurality of spacers disposed on the wire support rings between the eyelets of adjacent discrete bridge elements.

In an alternate embodiment, the rolling elements are hollow rollers, and the discrete bridge elements of the segmented bearing retainer assembly are pin elements disposed coaxially through the hollow rollers in the bearing assembly. Each discrete bridge elements consists of an axial pin section, terminating in eyelets at opposite ends extending axially past the rolling elements, through which the first and second wire support rings pass. A plurality of elongated radial lobes are disposed about each axial pin section, defining piloting contact surfaces between the inner diameter of the hollow rollers and the bridge elements. Voids between adjacent elongated radial lobes provide lubricant flow passages for the unobstructed delivery of lubricant to the contact surfaces within the hollow rollers. The discrete bridge elements are maintained in a desired spaced arrangement about the circumference of the bearing assembly, between the first and second wire support rings, by a plurality of spacers disposed on the wire support rings between the eyelets of adjacent discrete bridge elements.

In an alternate embodiment, the discrete bridge elements of the segmented bearing retainer assembly are formed from a powdered metal process. The discrete bridge elements may be impregnated with a lubricant, or optionally may have surface features or finishes which are configured to trap and release lubricants over time.

A method of the present disclosure for assembling a segmented bearing retainer assembly about an inner race of a tapered bearing is accomplished by initially threading a plurality of discrete bridge elements and spacers onto first and second wire segments, which are then looped and secured to form the first and second wire support rings. The total number of bridge elements threaded onto the support rings is equal to N−1, where N is the total number of rollers to be utilized. The total number of spacers on each support ring is equal to N. The assembly of bridge elements, spacers, and wire support rings is positioned over the inner race, and N individual rollers are inserted into the assembly by moving the bridge elements and spacers circumferentially around the first and second wire support rings to provide sufficient space for each insertion. After the final roller is installed on the inner race, the assembled rollers, bridge elements, and spacers are parted to open a space for the final discrete bridge element. After the final bridge element is inserted into the space, it is positioned to fill the remaining gap between the rollers, and is secured in place by bolting eyelet plates over each wire support ring at opposite ends of the final bridge element.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a perspective view of a pre-assembled segmented bearing retainer assembly or cage of the present disclosure;

FIG. 2 is an partial axial end view of the retainer assembly of FIG. 1, illustrating discrete bridge elements or segments arranged with tubular spacers on a wire support ring between adjacent rollers;

Corresponding reference numerals indicate corresponding parts throughout the several figures of the drawings. It is to be understood that the drawings are for illustrating the concepts set forth in the present disclosure and are not to scale.

Figure 3:
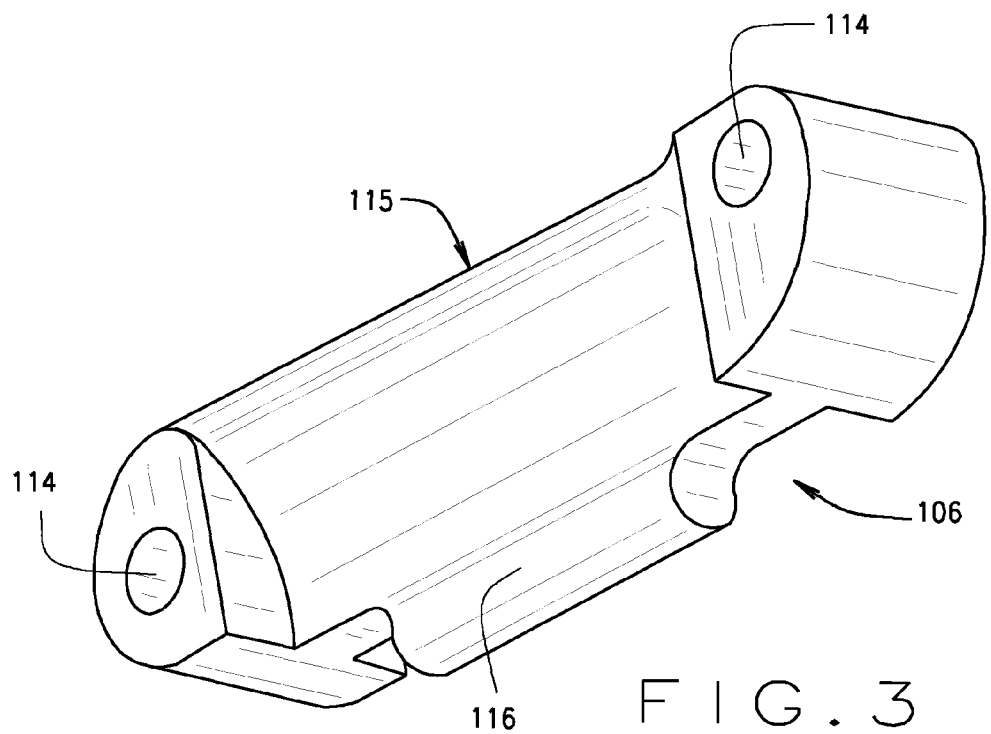
FIG. 3 is a perspective illustration of one embodiment of a discrete bridge element of the present disclosure for threading onto the first and second wire support rings between adjacent rollers.
Figure 4:
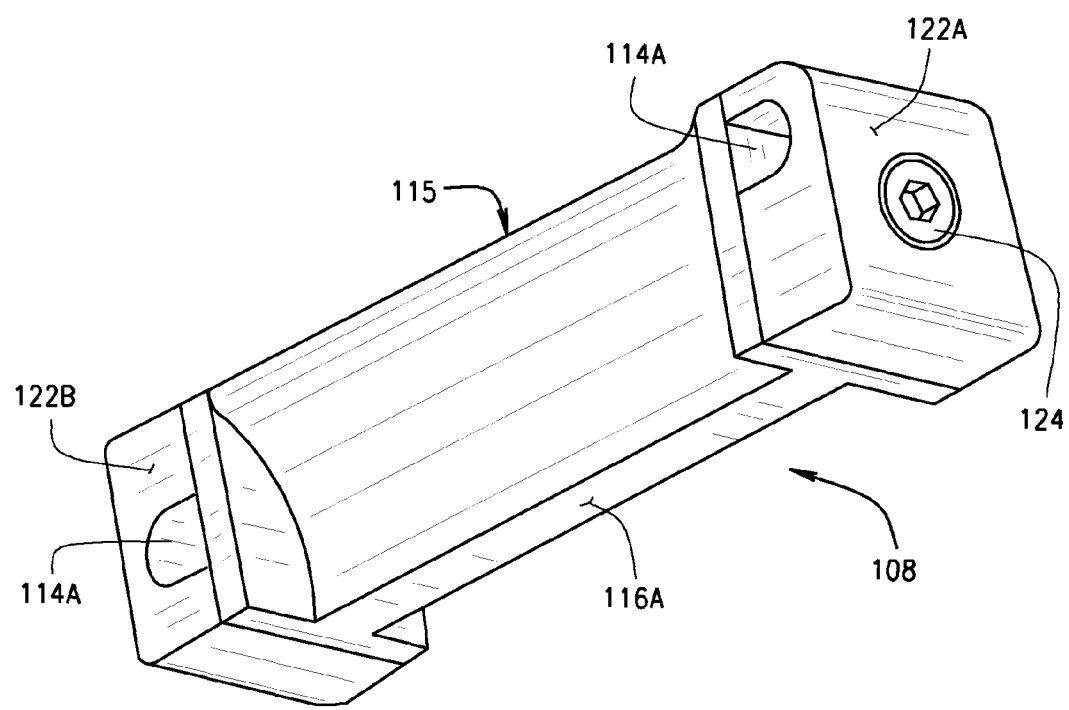
FIG. 4 is a perspective illustration of a final discrete bridge element of the present disclosure for clamping onto the first and second wire support rings between adjacent rollers, after all other discrete bridge elements are in place.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Refer to figures, and to FIGS. 1 and 2 in particular, a preassembled bearing retainer or cage of the present disclosure is shown generally at 100. The bearing retainer or cage 100 is comprised of a first circular hoop or ring 102, a second circular hoop or ring 104, multiple discrete bridge elements or segments 106, a single final bridge element or segment 108, and tubular spacers 110 (shown in FIG. 2) positioned on the first and second rings 102, 104 between each set of bridge elements or segments 106, 108. FIG. 2 shows how the tubular spacers 110 are positioned between each bridge element or segment 106, 108 on the rings 102, 104. These spacers 110 are designed to be long enough so that the radius R' of a circle described by the inside surface of adjacent bridge elements or segments 106, 108 is greater than a radius R of the rollers 112 within the bearing retainer or cage 100. Designed in this manner, each roller 112 is free to move within its respective pocket in the bearing retainer 100, such that the load on any bridge element or segment 106, 108 is a function of just the mass of the roller 112 either ahead of it or behind it, or a combination of both, depending on the dynamic condition.

A typical bridge element or retainer 106 is illustrated in FIG. 3. Each bridge element or segment contains an eyelet 114 at each end through which the first and second rings 102, 104 are passed. The bridge element 106 also contains a segment retention web 116 attached to the underside of a segment bridge 115, extending between the eyelets. The retention web 116 is a feature of this design that helps to keep the bridge element in alignment with the external curvature of the rollers 112, and which helps restrict radial deflection of the retainer assembly or cage 100 during operation. For example, in FIG. 2, as roller 112a travels through a load zone of the bearing, the roller can advance in its pocket space between adjacent bridge elements or segments 106a and 106b until it contacts the segment 106a ahead of it. The curvature of retention web 116 distributes the contact load between roller 112a and the bridge element 106a above and below the roller axial centerline, thereby reducing the tendency to lift and radially deflect the segment bridge 106a away from an inner race 118 and towards an outer race 120.

Since the first and second rings 102, 104 are passed through the eyelets 114 at each end of the discrete bridge elements or segments 106, assembly of the bearing assembly requires that a final bridge element or segment 108 be provided which can be secured onto the first and second rings 102, 104 by a different manner. The final bridge element 108 is distinctly different from all the other segments 106 in that it has no curved retention web 116 on the underside of its bridge portion. Rather, the bridge portion 115 terminates at a flat surface 116A permitting it to be inserted into a space between the last two rollers 112 placed in the bearing assembly 100. The final bearing element 108 also contains eyelet plates 122A and 122B located at each end, to be affixed to the bridge 115 with cap screws 124 applied one at each end, thereby securing the first and second rings 102, 104 within channels 114A covered by the eyelet plates 122A, 122B.

Figure 6:
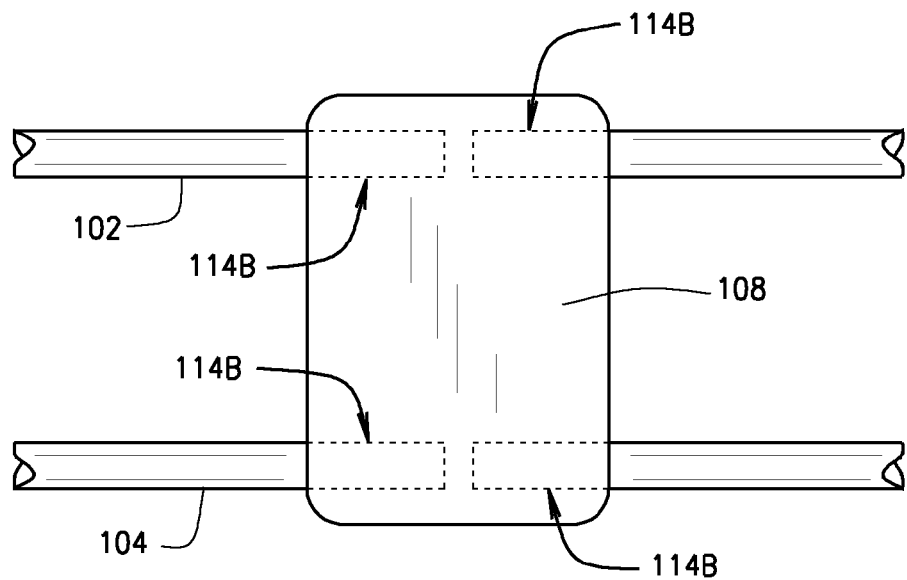
FIG. 6 is an alternative final discrete bridge element, which further functions to secure opposite ends of the first and second wire support rings together at a desired tension.

Those of ordinary skill in the art will recognize that other suitable attachment mechanisms such as rivets, adhesives, crimps and all other means of attachment may be considered in place of the cap screws. For example, as seen in FIG. 6, the ends of the first and second rings 102, 104 may be secured inside crimped passages 114B in the final bridge element 108, after a suitable tension has been achieved in the rings.

Construction of the bearing retainer or cage 100 as shown in FIG. 1 for use with a tapered bearing is as follows. Based on the size of the inner race 118, the required diameters of the first ring 102 and the second ring 104 are determined. Using a cutting procedure that has a thin kerf, each ring is cut through at one point, allowing all of segments 106, and spacers 110 to be threaded onto and positioned around the rings 102, 104, leaving out the final segment 108. The total number of discrete bridge elements or segments 106, not including the final bridge element 108, is equal to one less than the total number of rollers 112 to be employed in the bearing. The total number of spacers 110, on each ring 102, 104, is equal to the number of rollers 112. The first and second rings 102, 104 are then are welded or joined back together to form solid continuous rings.

Assembly of the bearing is next accomplished by supporting the inner race 118 on a work table or other surface with its back face or large end faced downward. The assembled cage 100 without the final segment 108 is brought into position over and around the bearing inner race 118. One by one, each of the rollers, typified by roller 112, are inserted onto the assembly by moving the bridge elements or segments 106 and spacers 110 (if required) circumferentially around the rings 102 and 104 to make space for insertion of the rollers 112. For installation of the final roller into its space on the inner race 118, it is necessary to separate the already assembled rollers 112, segments 106 and spacers 110 in opposite directions about the circumference of the rings 102, 104 to open sufficient space for the final roller. After the final roller is inserted into the opened space, the final bridge element or segment 108 is positioned to fill the remaining gap between the rollers 112, and the eyelet plates 122A and 122B are then bolted into position with cap screws 124 over the first and second rings 102, 104.

In an alternate method of assembly, the first and second rings 102, 104 remain cut during the assembly process. The cut rings are brought into position over and around the naked inner race 118, and are expanded, creating a circumferential gap at the region of the cuts which is of sufficient width to allow the bridge elements 106 and spacers 110 (if the design requires them) to be threaded onto the first and second rings 102, 104. These bridge elements 106 and spacers 110 are spread equally around the inner race 118 with rollers 112 positioned in between. When all of the rollers, bridge elements and spacers are installed, the cut ends of each ring are drawn together with the proper tension so that the appropriate clearance will be established between the rollers and the cage assembly. This clearance is referred to as "cage shake". Once the proper cage shake is established through proper tensioning of the rings, they must be joined through some means such as crimping (shown in FIG. 6), welding, or mechanical fastening as shown in FIGS. 7A-7C and 8.

Figure 7A:
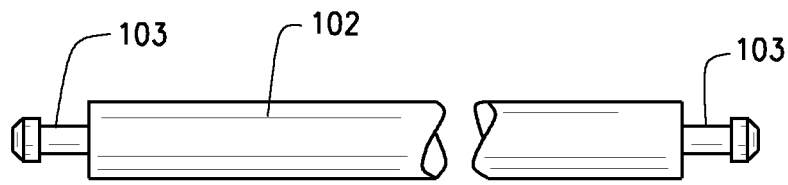
FIGS. 7A, 7B, and 7C illustrate an alternate method for securing opposite male ends of the first and second wire support rings together to form closed loops, using a female-female crimping tube segment.
Figure 7B:
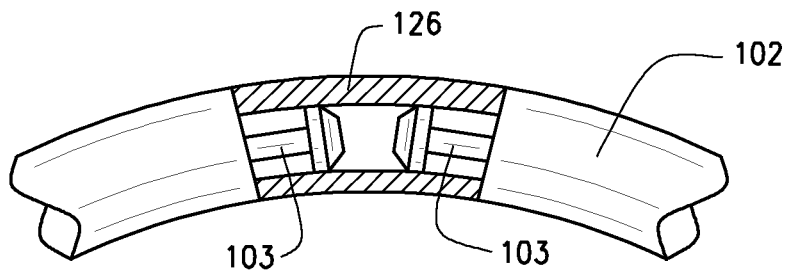
Figure 7C:
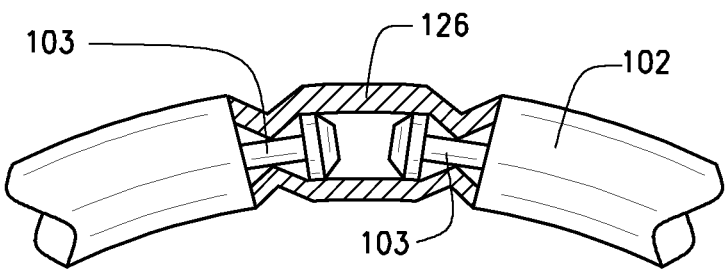
Figure 8:
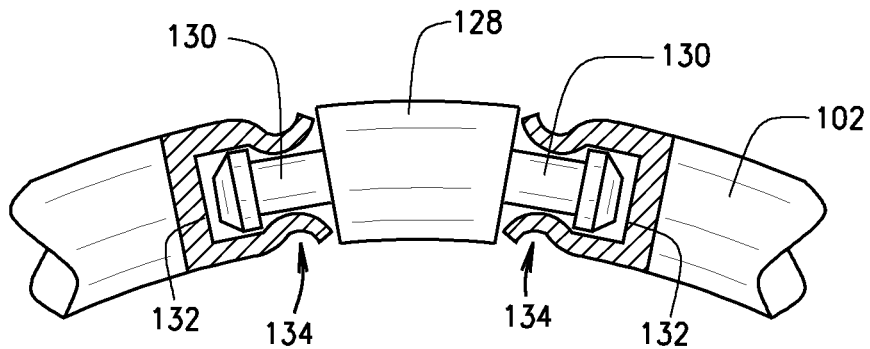
FIG. 8 illustrates an alternate variation of the method shown in FIGS. 7A-7C, employing a male-male segment for crimping engagement with opposite female ends of the first and second wire support rings.

An exemplary means for mechanical fastening is shown in FIGS. 7A-7C, in which each of the rings 102, 104 is initially formed from a length of wire having couplings 103 formed at each end. The length of wire is wrapped to form the ring configuration, with the couplings 103 at opposite ends facing towards each other. The couplings 103 are inserted into a fastening sleeve 126, (as seen in FIG. 7B) which is then crimped as shown in FIG. 7C to secure the couplings 103 in place, forming the continuous rings 102, 104. Alternatively, as shown in FIG. 8, the rings 102, 104 may be formed from a length of wire having female connectors 132 at each end, which each receive the couplings 130 from a connecting member 128 when looped to form the ring configuration. Each connecting member 128 is retained within the female connectors 132 by crimps 134 applied to the rings 102, 104 after they are positioned in the circular configuration.

It is important that the method used for rejoining the wire rings 102, 104 employs a suitable means to close the gap in the daisy chain of components so that the correct amount of circumferential clearance exists in the stack up of spacers 110 and bridge elements 106. When spacers 110 are used, this can be conveniently accomplished by modifying the spacer width(s) if necessary. If spacers 110 are not to be used, then the same circumferential clearance between rollers 112 and bridge elements 106 must also be controlled, for example by altering the width of the tab or coupling where the rings 102, 104 are rejoined with welding, fastening, crimping or other means.

Figure 9:
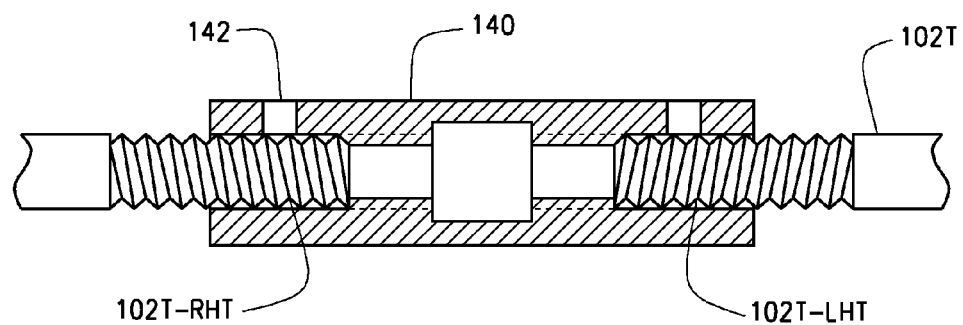
FIG. 9 illustrates a tensioning collar for securing opposite threaded ends of the first and second wire support rings together to form closed loops with adjustable tension.
Figure 10:
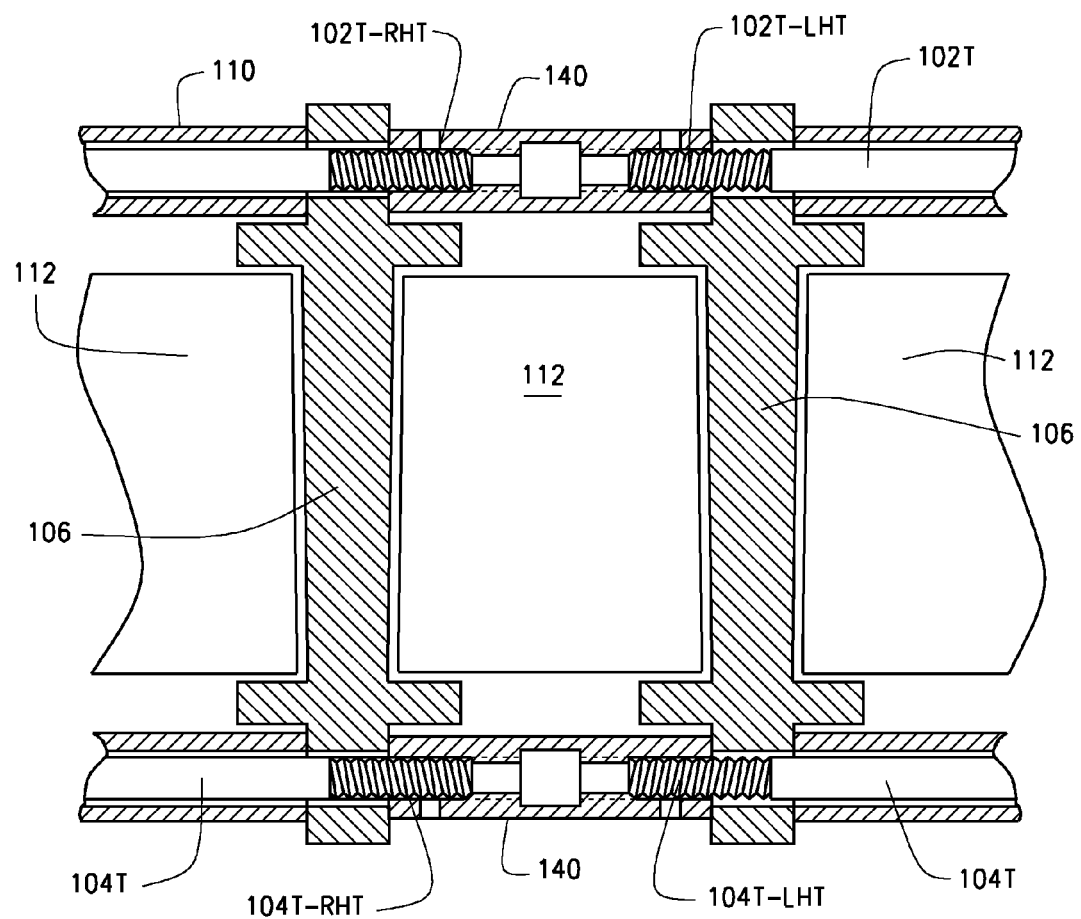
FIG. 10 illustrates a radial view of a portion of a segmented bearing retainer assembly which has been assembled using tensioning collars of FIG. 9.
Figure 11:
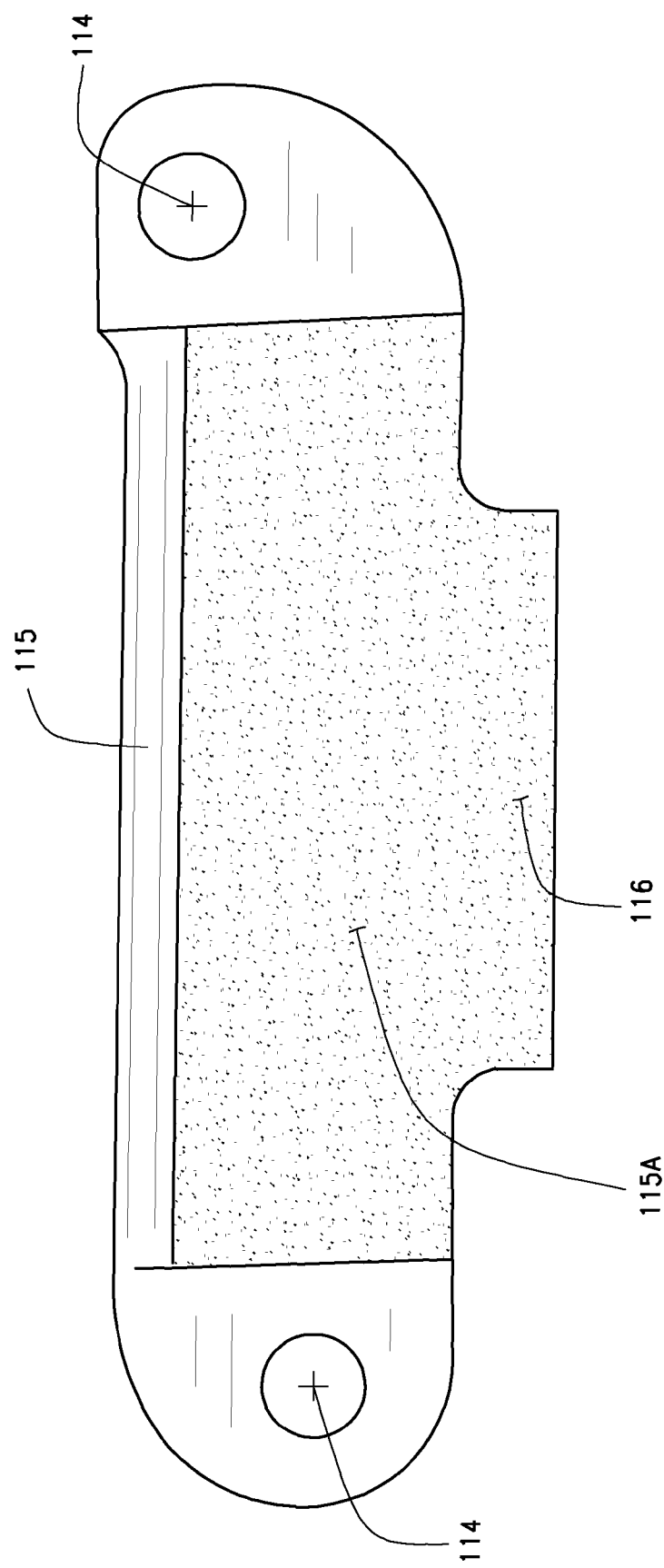
FIG. 11 is a side view of the discrete bridge element of FIG. 3, illustrating surface features for the entrapment and release of lubricant.

Alternatively, as seen in FIGS. 9 and 10, an adjustable tensioning collar or turnbuckle 140 may be utilized to secure the opposite ends of threaded wire rings 102T and 104T together. In order to utilize an adjustable tensioning collar or turnbuckle 140, opposite ends of each wire ring 102T, 104T must be threaded with threads of opposite directions, 102T-RHT, 102T-LHT, 104T-RHT, and 104T-LHT. To complete the close/rejoining of the wire rings 102T, 104T, the opposite ends of each wire ring are placed into the opposite ends of an axial bore through the adjustable tensioning collar or turnbuckle 140. A portion of the axial bore in the turnbuckle adjacent to each axial end face is threaded with an appropriate thread pitch diameter to receive the threaded ends of the wire rings 102T, 104T without binding, such that rotation of the adjustable tensioning collar or turnbuckle 140 in a first direction about a longitudinal axis will act to draw the ends of the rings 102T, 104T together within the axial bore, while rotation in the opposite direction will act to spread the ends apart. By rotationally adjusting the tensioning collar or turnbuckle a desired tension can be achieved for each wire ring 102T, 104T within the bearing assembly. Once the desired tension is reached, the tensioning collar or turnbuckle may be secured against further rotational adjustment by the placement of set screws or welds through radial passages 142. Preferably, as best seen in FIG. 10, the axial length of each tensioning collar 140 is selected to correspond to the required spacing between the ends of the bridge elements 106, such that the adjustable tensioning collar or turnbuckle 140 acts substantially the same as a spacer 110.

Figure 5:
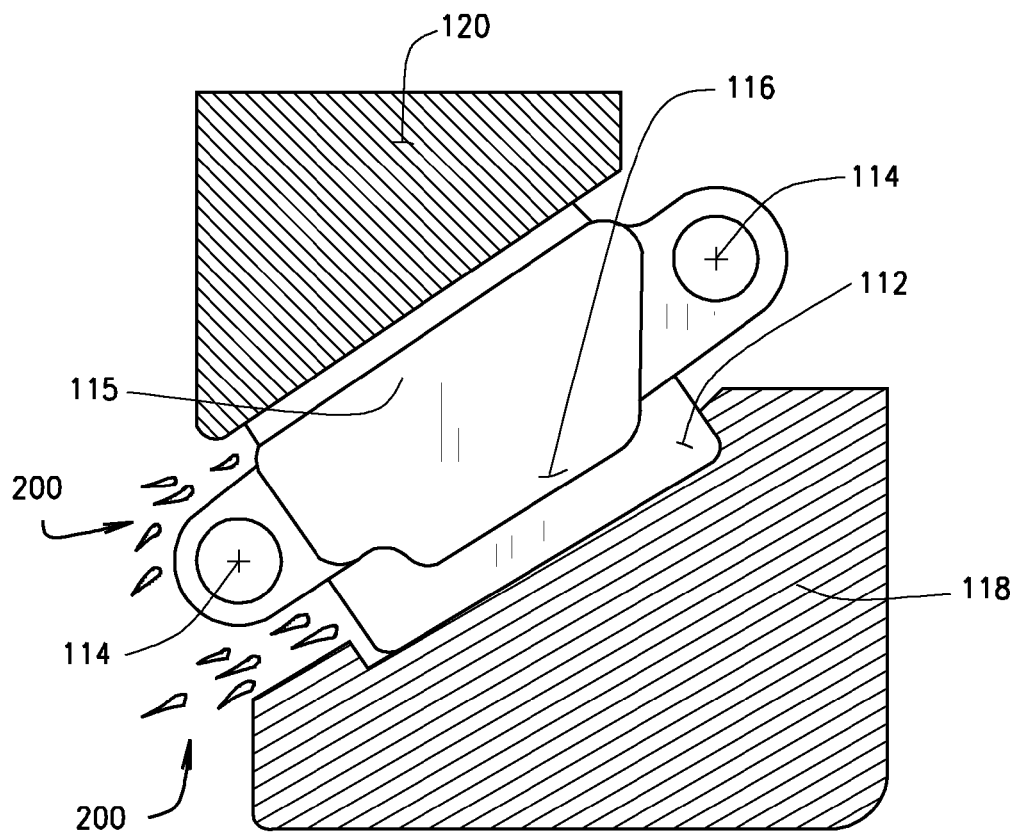
FIG. 5 is a radial sectional view of a retainer assembly installed between an inner race and an outer race, illustrating a lubricant flow past a discrete bridge element and towards critical wear surfaces within the bearing assembly.

The bearing retainer 100 of the present disclosure is configured to provide an improved flow of lubricant to critical wear surfaces within a bearing assembly, such as between the bridge elements 115 and the rollers 112. As seen in FIG. 5, the use of round cross-section rings 102, 104 and eyelet couplings 114 for the bridge elements 106 does not impede a flow of lubricant 200 axially entering the spaces between adjacent rollers 112. To further enhance lubrication, as shown in FIG. 9, the exposed surfaces 115A of the bridge elements or segments 106 may receive special finishes or textures intended to trap and release lubricant 200 in the contacts between the bridge elements 106 and rollers 112. These features can be applied to these surfaces 115A by pressing, forming, machining, molding or by other suitable means. While those of ordinary skill in the art will recognize that the bridge elements 106, 108 may be formed from a variety of materials, including polymers, metals, and powdered metals, it will be recognized that it is preferable to employ a compacted and sintered powered metal construction which produces very strong bridge elements suitable for use in very large bearing applications, and which can be optionally impregnated with lubricating materials, providing improved resistance to wear at the critical surfaces within the bearing assembly.

Figure 12:
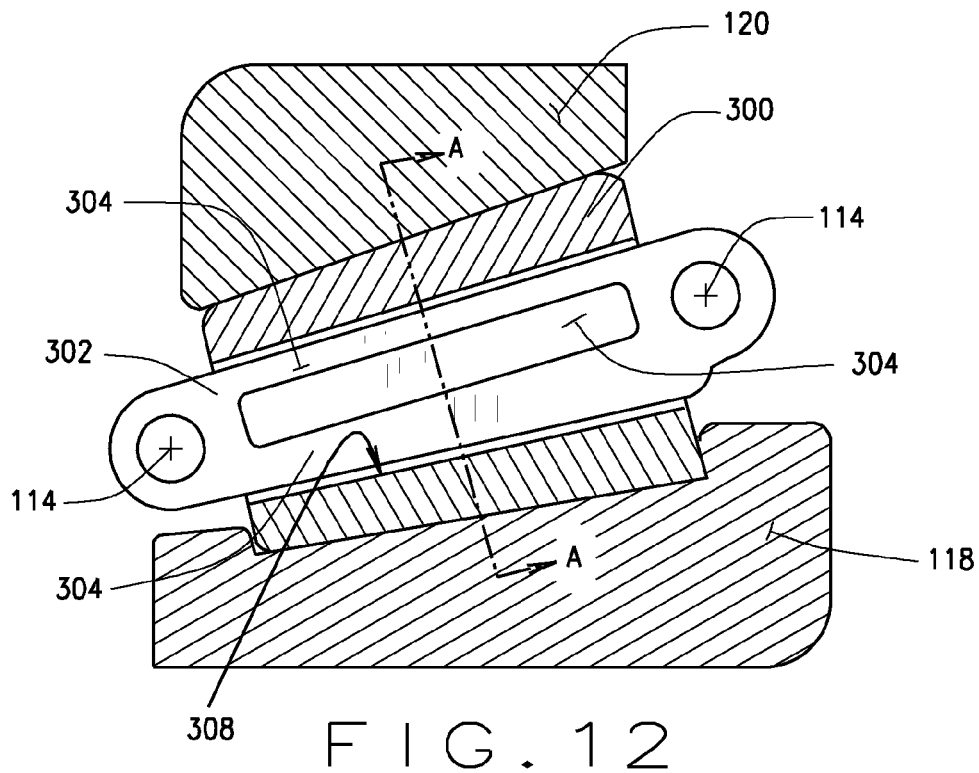
FIG. 12 is a radial sectional view of an alternate embodiment segmented bearing retainer assembly or cage of the present invention, employing discrete pin-elements passing axially through hollow tapered rollers for threaded coupling on first and second wire support rings.

Turning next to FIGS. 12-15, it is shown that the concepts of the bearing retainer assembly 100 of the present disclosure may be adapted for use with axially hollow rollers 300, such as shown in FIG. 12. In this configuration, each bridge element or segment 106 previously positioned between the rollers 112 is replaced with a pin-bridge element 302 that is located axially inside of the hollow roller 300. The pin-bridge elements 302 are still held in position with the first and second rings or hoops 102, 104 that pass through eyelet holes 114 at opposite ends of the bridge element 302.

Figure 13:
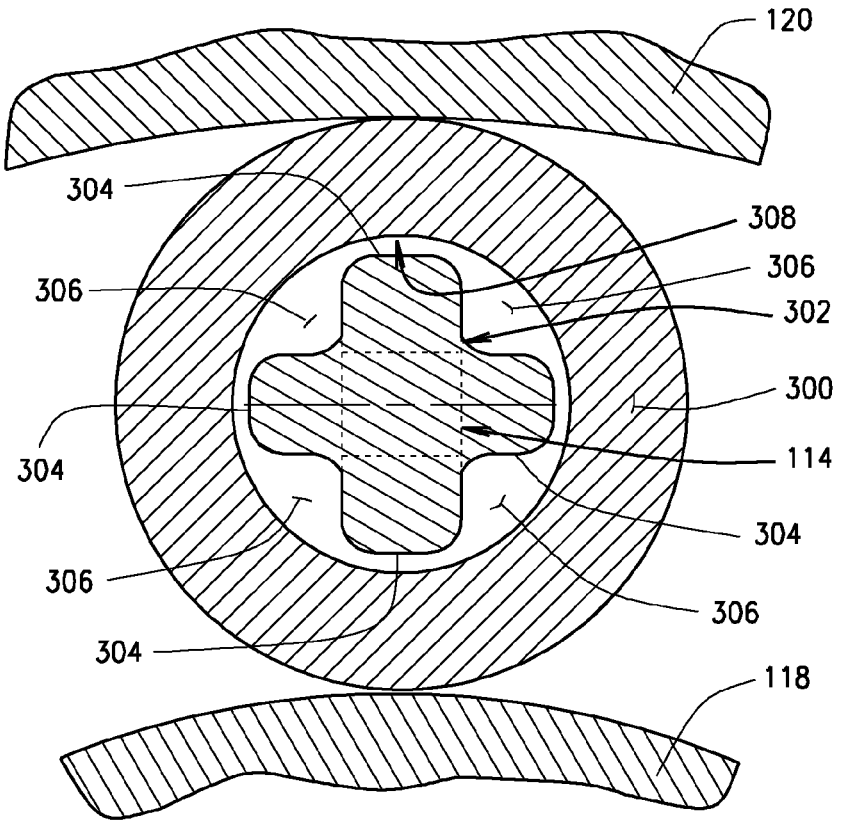
FIG. 13 is an axial end view of a hollow tapered roller of FIG. 12, illustrating elongated radial lobes disposed about each axial pin section of the pin-element, defining piloting contact surfaces between the inner diameter of the hollow tapered rollers, as well as voids adjacent each elongated radial lobe to provide lubricant flow passages within the hollow rollers.
Figure 14:
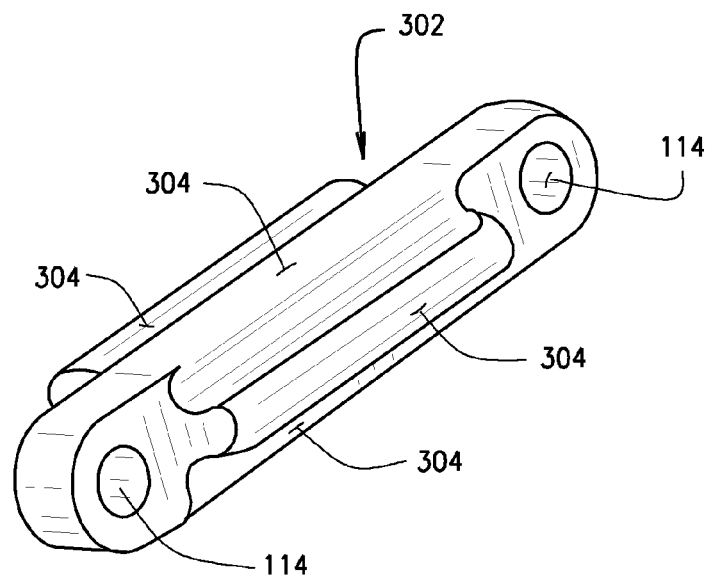
FIG. 14 is a perspective view of the pin-element of FIG. 12.

An exemplary configuration for a pin-bridge element 302 is seen in FIG. 13, taken at A-A of FIG. 12 and in the perspective illustration of FIG. 14. This configuration is shown to illustrate two important functions. First, four elongated radial lobes 304 center the pin-bridge 302 axially inside the hollow roller 300. Second, there are four axial voids 306 around the pin-bridge section within the hollow roller 300 which act as lubricant reservoirs to store lubricant and help maintain a continuous supply of lubricant in the close clearance contact regions at the outer surfaces of the elongated radial lobes 304 which engage the inner diameter surface 308 of the hollow roller 300.

Figure 15:
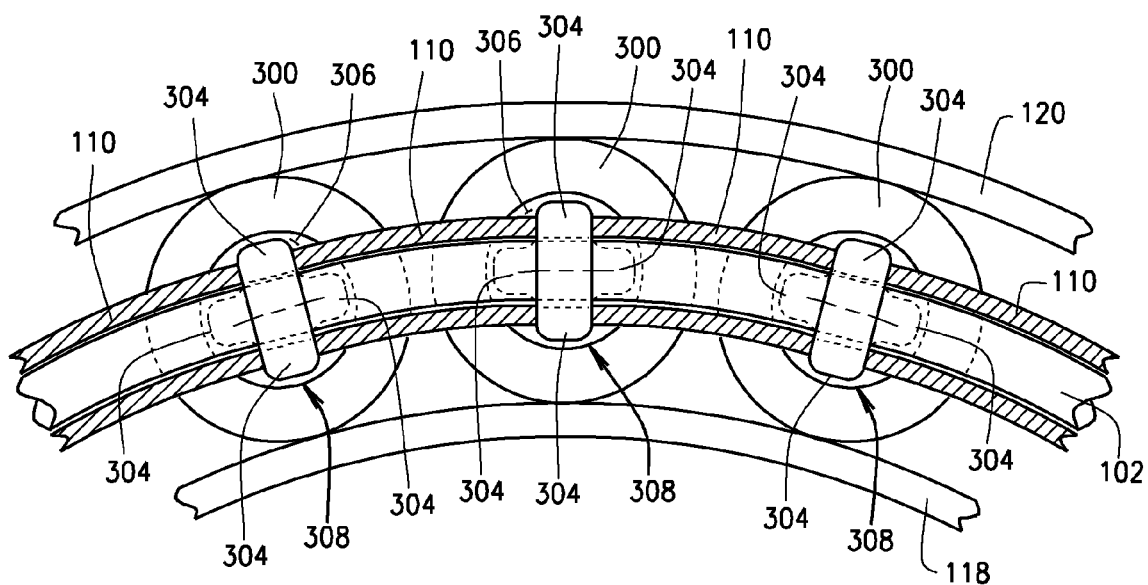
FIG. 15 is a partial axial view of the segmented bearing retainer assembly or cage of FIG. 12 illustrating discrete bridge elements or segments arranged with tubular spacers on a wire support ring between adjacent rollers.

Assembly of a bearing retainer assembly with the pin-bridge elements 302 is substantially similar to that previously described, but for the necessary placement of the hollow rollers 300 onto the pin-bridge elements 302 at the time of assembly. FIG. 15 represents a view from either axial end of an assembled bearing employing hollow rollers 300 and the pin-bridge elements 302 of the present disclosure. The assembly consists of a string of pin-bridge elements 302 inside the bores of the rollers 300 and spacers 110. This design is similar to the embodiment shown in FIG. 2, except the pin-bridge segments 302 pass through the rollers 300 instead of between them.

The use of pin-bridge elements 302 to couple the first and second rings 102, 104 when using hollow rollers 300 facilitates at least two things. First, unlike conventional pin cage configurations where rectangular sectioned cage rings cover access to the bores at each end of the hollow rollers 300, restricting flow of lubricant (especially higher consistency greases) into this critical interface, the present design uses the rings 102, 104 and spacers 110 in combination which allows for an improved flow of lubricant to the axial openings of the hollow rollers 300, so that the lubricant can fill the space inside the hollow rollers. Allowing lubricant to gain easy access into this area is important so that the interface between the surfaces of the pin-bridge element 302 and roller inner diameter surfaces 308 can be constantly replenished with lubricant, thereby reducing the potential for wear.

The second benefit is that this bearing retainer or cage design 100 is particularly well suited for a bearing design in which the hollow rollers 300 are designed and manufactured with oversized axial bores to reduce the roller mass and cost. The bridge sections 304 of the pin-bridge element 302 can be increased to add strength and piloting without resorting to a round section pin which adds back the weight saved from the hollow roller 300. Other pin-bridge element configurations which differ from the one shown in FIGS. 12-15 can be designed which will accomplish the same function, such as by varying the number or shape of the elongated radial lobes 304.

As various changes could be made in the above constructions without departing from the scope of the disclosure, it is intended that all matter contained in the above description or shown in the accompanying drawings shall be interpreted as illustrative and not in a limiting sense.

What is claimed is:

1. A bearing cage structure for use with a bearing assembly having a plurality of rolling elements disposed about a circumference of a race member, comprising:
    a first wire support ring disposed adjacent an axially first end of the rolling elements and bearing assembly;
    a second wire support ring disposed adjacent an axially second end of the rolling elements and bearing assembly; and
    a plurality of discrete bridge elements coupled between the first and second wire support rings, each of said bridge elements configured to maintain a spacing between adjacent rolling elements and to retain said rolling elements relative to said race member; and
    a plurality of tubular spacers disposed on at least one of said first and second wire support rings annularly between adjacent discrete bridge elements, said tubular spacers configured to maintain a spacing between said adjacent discrete bridge elements.

2. The bearing cage structure of claim 1 where said first and second wire support rings are threaded through eyelets at opposite ends of each of said plurality of discrete bridge elements.

3. The bearing cage structure of claim 2 further including a final bridge element secured onto said first and second wire support rings by eyelet plates;

wherein each of said plurality of discrete bridge elements and said final bridge element is disposed between a pair of adjacent rolling elements; and, wherein each of said attachment plates is configured with a channel to receive a respective wire support ring, and a coupling means to secure each of said eyelet plates to said bridge element.

4. The bearing cage structure of claim 3 wherein said final bridge element is configured to removably couple between said first and second wire support rings without disassembly of said bearing cage structure.

5. The bearing cage structure of claim 2 wherein each of said plurality of bridge elements consists of an axial segment bridge, each of said eyelets disposed adjacent to an axially opposite end of said axial segment bridge, and a retention web connected to the underside of said axial segment bridge, said retention web having curved surfaces conforming to the surface curvature of adjacent rolling elements.

6. The bearing cage structure of claim 5 wherein said curved surfaces of said retention webs are configured to maintain said bridge elements in alignment with said adjacent rolling elements and to restrict radial deflection by distributing contact loads between said bridge elements and said adjacent rolling elements both above and below an axial centerline of the rolling elements.

7. The bearing cage structure of claim 2 wherein said rolling elements are hollow, each having an axial bore, wherein each of said plurality of discrete bridge elements is disposed within an axial bore of a rolling element, and wherein each of said bridge elements defines an axial pin bridge, each of said eyelets disposed adjacent to an axially opposite end of said axial pin bridge, and a plurality of elongated radial lobes disposed on said axial pin bridge, said elongated radial lobes conforming to an inner surface of said axial bore in an associated hollow roller to center said pin bridge element within said axial bore.

8. The bearing cage structure of claim 7 wherein said elongated radial lobes on said axial pin bridges define a plurality of axial voids within said axial bore of said hollow roller, said axial voids facilitating an improved flow of lubricant to critical surfaces within the bearing cage structure.

9. The bearing cage structure of claim 1 wherein at least one surface of said plurality of discrete bridge elements is textured to entrap and release lubricant.

10. The bearing cage structure of claim 1 wherein said plurality of discrete bridge elements are formed from a compacted and sintered powdered metal.

11. The bearing cage structure of claim 1 wherein said plurality of discrete bridge elements are impregnated with a slow-release lubricant.

12. The bearing cage structure of claim 1 wherein said first and second wire support rings are formed from wire segments by crimping or welding opposite segment ends in an annular configuration.

13. The bearing cage structure of claim 1 wherein said first and second wire support rings are tension members, each having a circumference selected to achieve a desired tension in said bearing cage structure.

14. The bearing cage structure of claim 13 wherein said first and second wire support rings, each have opposite threaded ends threaded into an adjustable tensioning collar or turnbuckle for adjustment of said desired tension.

15. The bearing cage structure of claim 14 wherein each adjustable tensioning collar or turnbuckle has an axial length selected to maintain a spacing between said adjacent discrete bridge elements.

16. A method for assembling a bearing cage structure of a bearing assembly, comprising:

selecting first and second discontinuous wire support ring segments, said wire support ring segments having circumferential lengths selected to accommodate dimensions of the bearing assembly;

coupling said first and second wire support rings together in an axially spaced arrangement by threading a plurality of discrete bridge elements onto said first and second wire support rings, said plurality of discrete bridge elements each being threaded onto said first and second wire support rings at said discontinuities via eyelets at opposite axial ends of said discrete bridge elements, such that said first and second wire support ring segments are coupled together by said plurality of discrete bridge elements arrayed substantially uniformly about a circumference of said first and second wire support rings;

disposing tubular spacers on said first and second support rings between a plurality of adjacent discrete bridge elements;

securing opposite ends of said first discontinuous wire support ring segment together to form a first closed wire support ring;

securing opposite ends of said second discontinuous wire support ring segment together to form a second closed wire support ring; and fitting a plurality of rolling elements into said assembly, said spacing between adjacent rolling elements determined by spacing between adjacent discrete bridge elements coupling said first and second wire support rings.

17. The method of claim 16 further including the step of positioning said assembly of said first and second wire support rings, said plurality of bridge elements, and said plurality of spacers over a tapered inner race of said bearing assembly prior to fitting said plurality of rolling elements into said assembly.

18. The method of claim 17 wherein said step of fitting said plurality of rolling elements into said assembly includes fitting at least one rolling element between each adjacent bridge element, and fitting two rolling elements between one pair of adjacent bridge elements; and further including the step of securing a final bridge element between said first and second wire support rings between said two adjacent rolling elements.

19. The method of claim 16 wherein said plurality of rolling elements are fitted into said assembly prior to the steps of securing opposite ends of said first and second discontinuous wire support ring segments together, respectively, to form said first and second closed wire support rings.

20. The method of claim 16 wherein said rolling elements are axially hollow, and wherein said step of fitting said plurality of rolling elements into said assembly includes disposing each of said discrete bridge elements within an axial bore of associated rolling elements prior to threading said plurality of discrete bridge elements onto said first and second wire support rings.

21. The method of claim 16 wherein said opposite ends of said first and second discontinuous wire support ring segments are threaded, and wherein securing opposite ends of said first and second discontinuous wire support ring segments together includes threading said opposite ends of said first discontinuous wire support ring segment into a first adjustable tensioning collar or turnbuckle and threading said opposite ends of said second discontinuous wire support ring segment into a second adjustable tensioning collar or turnbuckle.

22. The method of claim 21 further including adjusting said first and second tensioning collars or turnbuckles to achieve a desired tension in said bearing cage structure.

* * * * *